United States Patent [19]
Yamagata et al.

[11] Patent Number: 6,054,936
[45] Date of Patent: Apr. 25, 2000

[54] MOVING BODY DETECTION SYSTEM

[75] Inventors: Tetsuo Yamagata; Hajime Tabata, both of Wako, Japan

[73] Assignee: Honda Giken Kogyo Kabushiki Kaisha, Tokyo, Japan

[21] Appl. No.: 09/329,216

[22] Filed: Jun. 10, 1999

[30]       Foreign Application Priority Data

Jun. 10, 1998   [JP]   Japan .................................. 10-162654

[51] Int. Cl.$^7$ ...................................................... G08G 1/16
[52] U.S. Cl. ........................... 340/903; 340/933; 340/935
[58] Field of Search .................................... 340/901, 903, 340/905, 928, 933, 935

[56]               References Cited

U.S. PATENT DOCUMENTS

| | | | |
|---|---|---|---|
| 5,581,249 | 12/1996 | Yoshida | 340/928 |
| 5,710,556 | 1/1998 | Nishimura et al. | 340/928 |
| 5,952,940 | 9/1999 | Matsumoto | 340/917 |

FOREIGN PATENT DOCUMENTS

| | | |
|---|---|---|
| 2216600 | 8/1990 | Japan . |
| 7225274 | 8/1995 | Japan . |

*Primary Examiner*—Edward Lefkowitz
*Attorney, Agent, or Firm*—Birch, Stewart, Kolasch & Birch, LLP

[57]               ABSTRACT

A moving body detection system for detecting moving bodies by transmitting and receiving signals between the moving bodies, each moving body transmits an ID code capable of identifying the moving body itself as a fixed output ID code signal for a fixed period. A detection side moving body receives the ID code signal for the same transmission period as the ID code signal based on changes in driving conditions, discriminates the received ID signal and gives an order of priority to each ID code based on the discrimination results, and transmits a detection signal with the ID code and the ID code of the detection side moving body itself added at prescribed time intervals in ID code order. A non-detection side moving body receives the detection signal, and transmits a response signal with its own ID code and the ID code of the detection side moving body added if the ID code added to the detection signal is the same as its own ID code. Furthermore, the detection side moving body receives the response signal and measures the distance to the non-detection side moving body having the same ID code as the response signal.

16 Claims, 6 Drawing Sheets

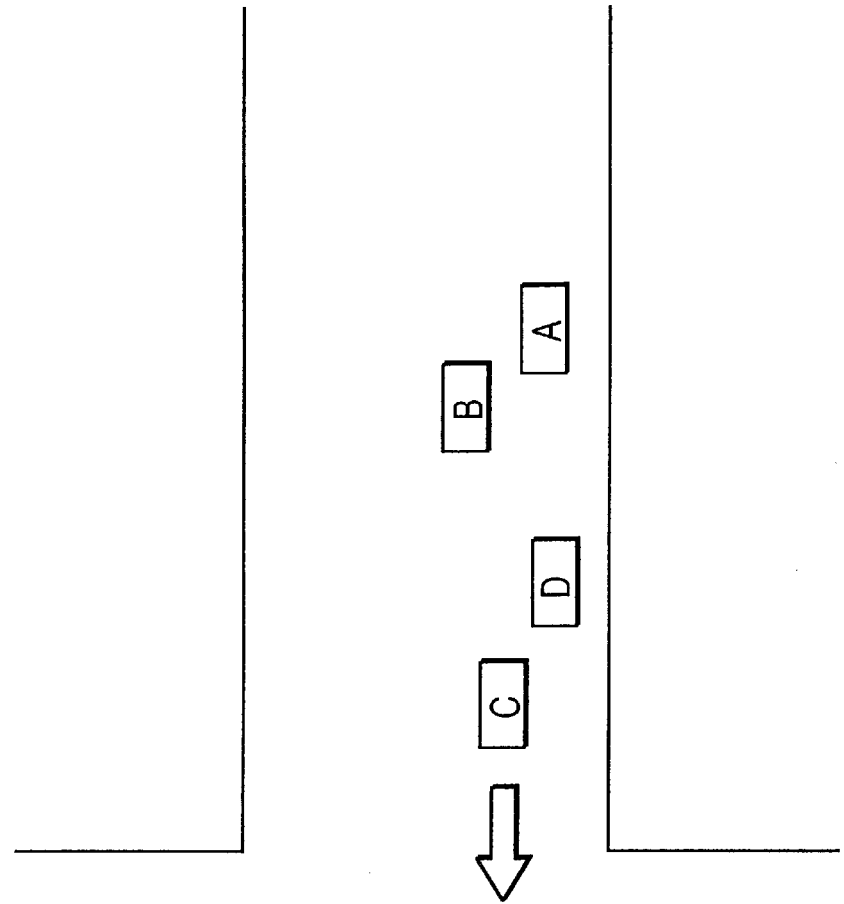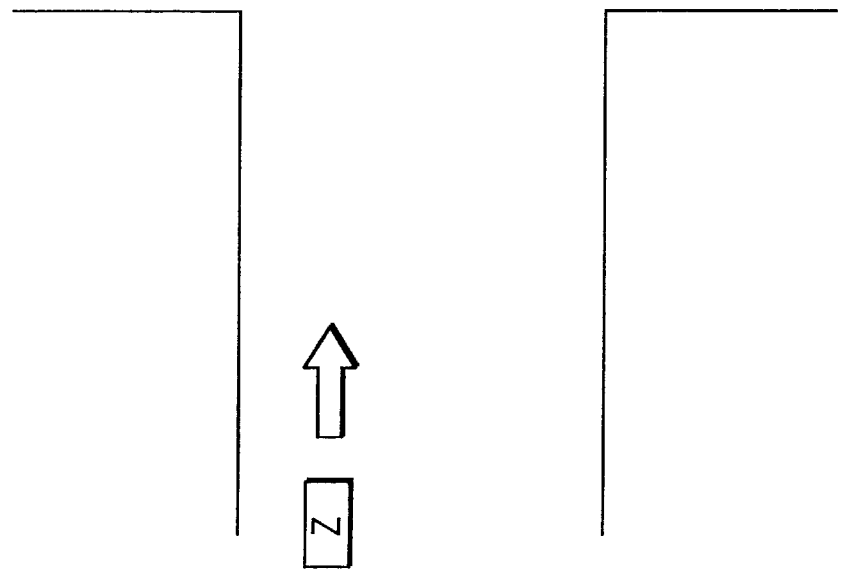
FIG. 4

ID CODE SIGNALS TRANSMITTED BY A, B, C AND D

ID CODE SIGNAL TRANSMITTED BY Z

MOVING BODY DETECTION SYSTEM

BACKGROUND OF THE INVENTION

1. Field of the Invention

The present invention relates to a moving body detection system for detecting moving bodies by exchanging signals between the moving bodies. More particularly, the present invention relates to a moving body detection system for detecting moving bodies such as vehicles, pedestrians, etc.

2. Description of Related Art

Various methods have been used in the related art for detecting other approaching vehicles and other moving bodies while driving.

For example, in Japanese Patent Laid-open Publication No. Hei 2 (1990)-216600, a receiving device provided in a vehicle carries out monitoring as the vehicle progresses. An alarm is generated and the presence of a moving body made known as a result of the receiving device receiving an alarm signal transmitted by a transmission device provided on another moving body.

However, since the number of moving bodies that may cause the alarm unknown, when only one vehicle is confirmed by sight, it is difficult notice the presence of other vehicles.

Therefore, in Japanese Patent Laid-open Publication No. Hei 7(1995)-225274, confirmation is displayed as a result of discerning whether or not one or a plurality of moving bodies exist within a prescribed distance by comparing intervals of rises of consecutive pulses occurring in a receive signal with a reference period.

However, the device only determines whether one or a plurality of moving bodies is present and it is not possible notice configurations such as the arrangement of the moving bodies when a plurality of moving bodies are present. It is more convenient for the driver of the vehicle to determine how the opposing moving bodies are arranged, rather than just receiving information regarding whether one or a plurality of moving bodies are present.

Furthermore, even if a plurality of opposing moving bodies are detected, the distance to all of the opposing moving bodies cannot be measured at the same time.

SUMMARY OF THE INVENTION

In order to resolve these problems, it is the object of the present invention to provide a moving body detection system capable of measuring distances to a plurality of opposing moving bodies.

In order to achieve the aforementioned object, the present invention provides a moving body detection system for detecting moving bodies by transmitting and receiving signals between the moving bodies. Each moving body transmits an ID code capable of identifying the moving body itself as a fixed output ID code signal for a fixed period. A detection side moving body receives the ID code signal for the same transmission period as the ID code signal based on changes in driving conditions, discriminates the received ID signal, and prioritizes each ID code based on the discrimination results. The detection side moving body then transmits a detection signal with the ID code and the ID code of the detection side moving body itself added at prescribed time intervals in ID code order. A non-detection side moving body receives the detection signal and transmits a response signal with its own ID code and the ID code of the detection side moving body added if the ID code added to the detection signal is the same as its own ID code. The detection side moving body then receives the response signal and measures the distance to the non-detection side moving body having the ID code for the same response signal.

The detection side moving body discerns the ID code received under receiving conditions having the same transmission period as the ID code signal and decides an order for the ID codes. The detection side moving body then transmits a detection signal with the ID code and the ID code of the detection side moving body itself added at prescribed time intervals in order from the first ID code. The non-detection side moving body having the first ID code then responds to the transmission of the initial detection signal, and the distance to the same non-detection side moving body is measured. The non-detection side moving body having a second ID code responds to the transmission of a second detection signal and the distance to the same non-detection side moving body is measured. In this manner, the distances to a plurality of non-detection side moving bodies can be sequentially measured.

The driver of the detection side moving body can therefore confirm the arrangement of the opposing non-detection side moving bodies.

In a second aspect of the present invention, the detection side moving body receives the ID code, discerns the signal receiving power of the ID code signal and decides an order for the ID codes according to the strength of the signal receiving power.

Since the ID code signals are transmitted at fixed outputs, the ID code signal receiving power received by the detection side moving body is larger for closer non-detection side moving bodies.

Furthermore, the distance to non-detection side moving bodies is measured, the closest non-detection side moving body being measured first, by deciding the ID code order according to the strength of the signal receiving power. The distance to close opposing moving bodies can therefore be determined quickly.

In a third aspect of the present invention, the detection side moving body receives the ID code signal within a prescribed period of time based on changes in driving conditions where a indicator switch is operated in order to make a turn from a current lane of travel to another direction.

In the case of making a turn from the current lane of travel to another direction, and in particular when making a turn across an opposite lane, it is necessary to detect moving bodies approaching head on in the opposite lane. By adopting ID code signal receiving conditions based upon the operation of an indicator lever when making a turn, which operates an indicator switch, the ID code signal of a non-detection side moving body can be received only when necessary. Furthermore, a detection signal is transmitted, opposing moving bodies are sequentially detected and distances can be measured only when necessary.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein:

FIG. 4 is a simplified plan view illustrating a travelling situation for a plurality of cars;

DESCRIPTION OF THE PREFERRED EMBODIMENTS

Figure 1:
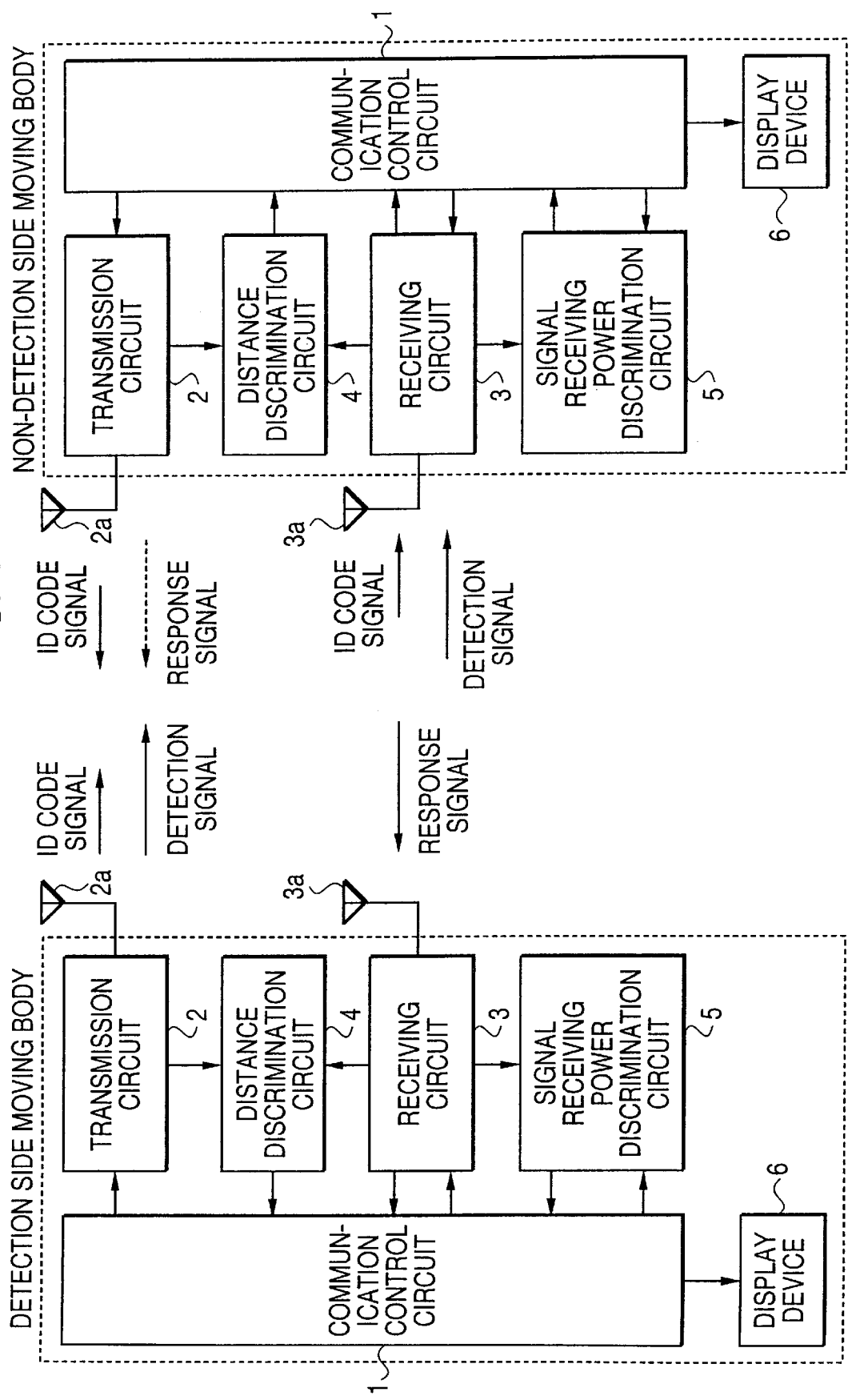
FIG. 1 is a simplified block diagram for a moving body detection system according to an embodiment of the present invention.

The present invention will now be described with reference to FIGS. 1–7. A simplified block diagram for a moving body detection system according to an embodiment of the present invention is illustrated in FIG. 1.

All of the moving bodies are equipped with the same communication control device. Namely, a communication control circuit 1 provides a transmission instruction to a transmission circuit 2 and receives the input of a signal received by a receiving circuit 3. The communication control circuit 1 also receives an input of a distance discrimination signal from a distance discrimination circuit 4 and a signal receiving power discrimination signal from a signal receiving power discrimination circuit 5. Furthermore, results of signal processing are output to a display device 6 as a display signal.

The transmission circuit 2 transmits an ID code signal, receives a transmission instruction from the communication control circuit 1, and generates a detection signal in a predetermined direction from a transmission antenna 2a.

The receiving circuit 3 receives an ID code signal, receives a response signal at a receiving antenna 3a and outputs this response signal to the communication control circuit 1.

A signal at the time of generation of the detection signal from the transmission circuit 2 and a signal for the time of receipt of the response signal from the receiving circuit 3 are input to the distance discrimination circuit 4. The distance discrimination circuit 4 then determines the distance between the detection side moving body and the non-detection side moving body from the time difference between the signals and outputs a distance determination signal for the determination results to the communication control circuit 1.

The signal receiving power discrimination circuit 5 detects a signal-receiving power value for the ID code signal received by the receiving circuit 3 and outputs a received signal power value signal to the communication control circuit 1. The communication control circuit 1 then arranges each ID code in order in accordance with the magnitude of the receiving power value.

The display device 6 is a liquid crystal display for notifying the driver of the arrangement configuration, i.e., the distance etc. to a non-detection moving body when there is a response signal.

The ID code signal is a fixed output pulse signal for a fixed period T, which includes an ID code for identifying the moving body itself from other moving bodies.

Figure 2:
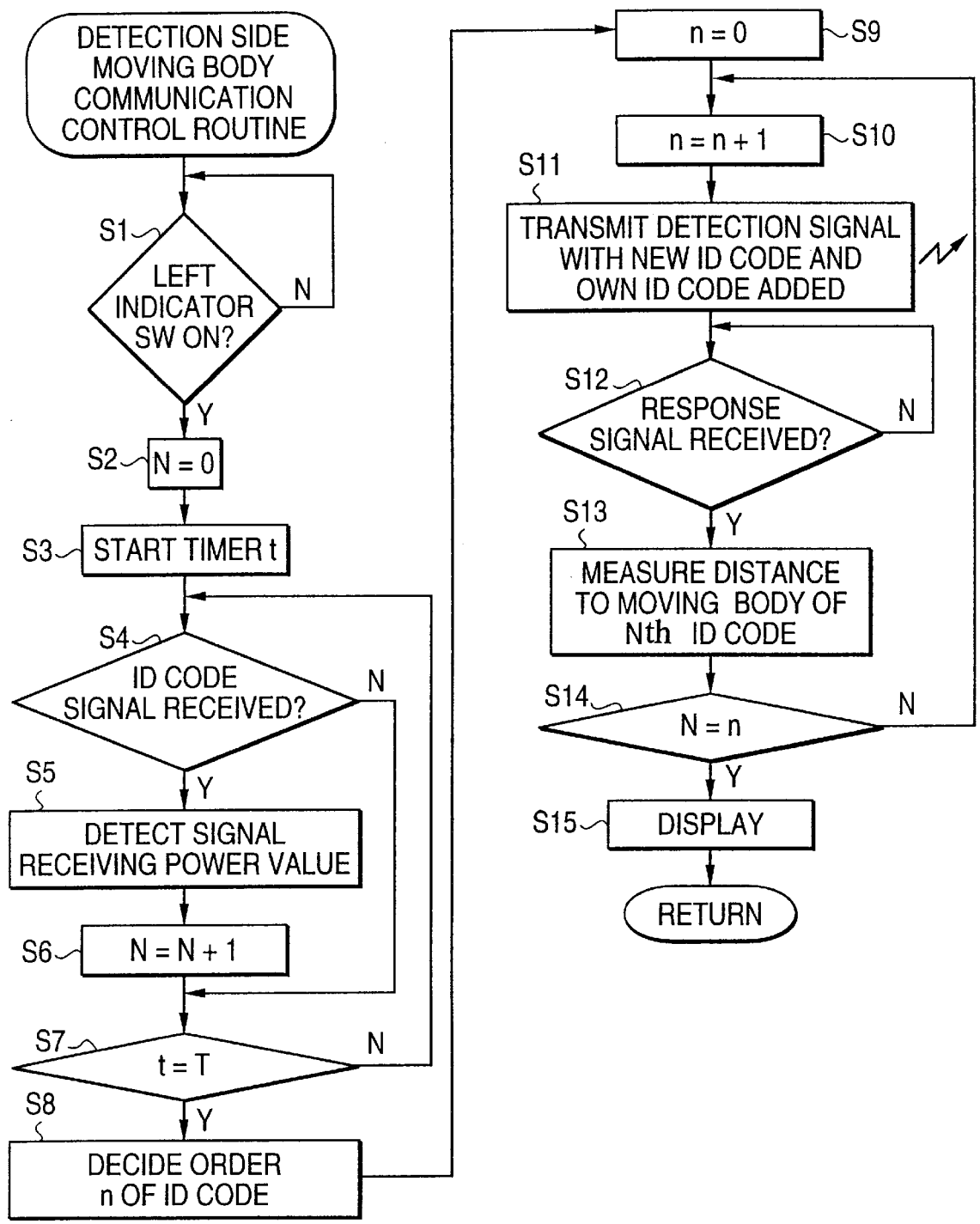
FIG. 2 is a flowchart illustrating the communication control routine of the detection side moving body.
Figure 3:
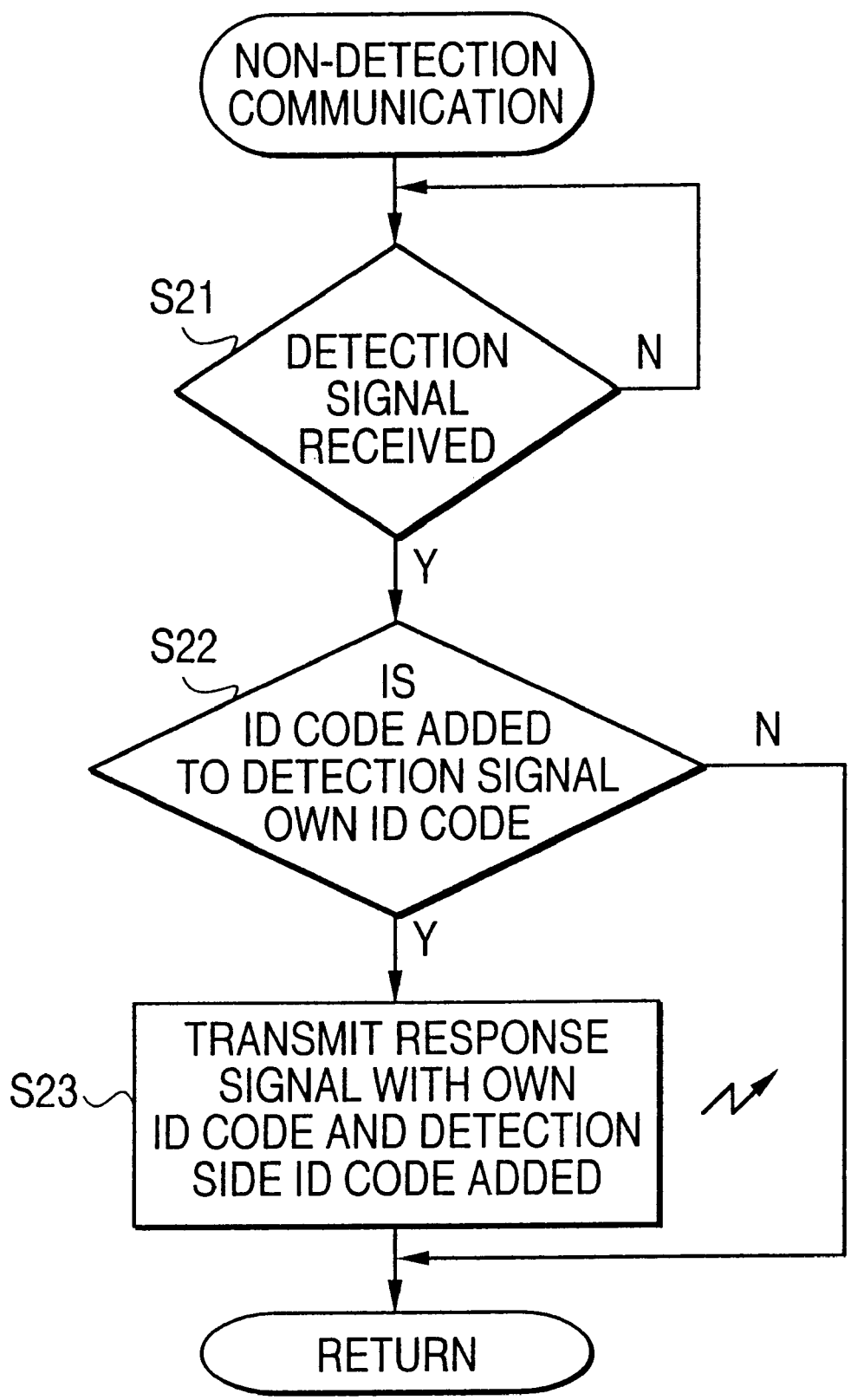
FIG. 3 is a flowchart illustrating the communication control routine for the non-detection side moving body.

Communication control occurring at the detection side moving body is described in the flowchart of FIG. 2, and communication control occurring at the non-detection side moving body is described in the flowchart of FIG. 3.

The ID code signal is usually transmitted in addition to the communication control shown in FIG. 2 and FIG. 3 for both the detection side moving body and the non-detection side moving body.

In this embodiment, a vehicle is proceeding on the left side of the street. Referring to FIG. 2, in the communication control for the detection side moving body, it is determined whether or not the detection side moving body is making a right turn from the operation of the right indicator switch (step 1). When the right indicator switch is on so that a right turn is about to be made, at step 2, a receipt number N for the ID code signal is cleared. At step 3, the timer t is started, and the presence or absence of the receipt of an ID code signal is determined in step 4.

When an ID code signal is not received, at step 7, a determination is made as to whether or not the timer clock time t has reached a setting time T. The routine returns to step 4 until the setting time is reached (t=T).

When an ID code signal is received within the setting time T, the routine proceeds to step 5 from step 4. At step 5, the signal receiving power value for the received ID code signal is detected. At step 6, the receipt number N is incremented and the routine then proceeds to step 7.

The setting time T is equal to the transmission period T of the ID code signal.

The ID code signal receipt conditions are therefore taken at the same time as the transmission period T. When a signal is received during this time, the signal receiving power value is detected (step 5) and the receipt number N is counted (step 6).

When a prescribed time T has passed, the routine proceeds to step 8 from step 7 where the ID codes for each received ID code signal are arranged in order of signal receiving power value. Furthermore, an order n is determined for each ID code.

Namely, the ID code for the ID code signal of the largest signal receiving power is considered number 1, the ID code for the ID code signal of the next largest signal receiving power is considered number 2, etc., until an order is determined for the ID code of the Nth ID code signal received.

The count value n is then cleared (step 9) and the routine proceeds to step 10 where the count value n is incremented so that n=1. The routine then proceeds to step 11.

In step 11, first, a detection signal with the ID code of number 1 and the ID code of the detection side moving body itself added thereto is transmitted.

The receipt of a response signal for this detection signal is then awaited. When a response signal is received, the routine proceeds to step 13 and the distance to the non-detection side moving body having the ID code number 1 is measured. The distance is measured from the time difference between transmission of the detection signal and the receipt of the response signal.

This count number n is compared with the receipt number N (step 14). If the count number n has not reached the receipt number N, the routine returns to step 10. The count value n is then incremented so that n=2. Steps 11, 12, 13 and 14 are then repeated, signals are transmitted to and received from the non-detection side moving body for a second ID code, and a distance is measured.

Steps 10, 11, 12, 13 and 14 are then repeated N times until the distance to the non-detection side moving body having the Nth ID code is measured. The routine then proceeds to step 15 from step 14 and the measurements are displayed on the display device 6.

In the communication control for the non-detection side moving body, referring to FIG. 3, the receipt of a detection signal from the detection side moving body is awaited (step 21). If a detection signal is received, the routine proceeds to step 22 and a determination is made as to whether or not the ID code added to the detection signal coincides with the ID code of the moving body itself. If this is not the case, the routine is exited without sending a response signal. If this is the case, the routine proceeds to step 23 and a response signal having the ID code of the moving body itself and the ID code of the detection side moving body that transmitted the detection signal added thereto is transmitted.

Figure 5:
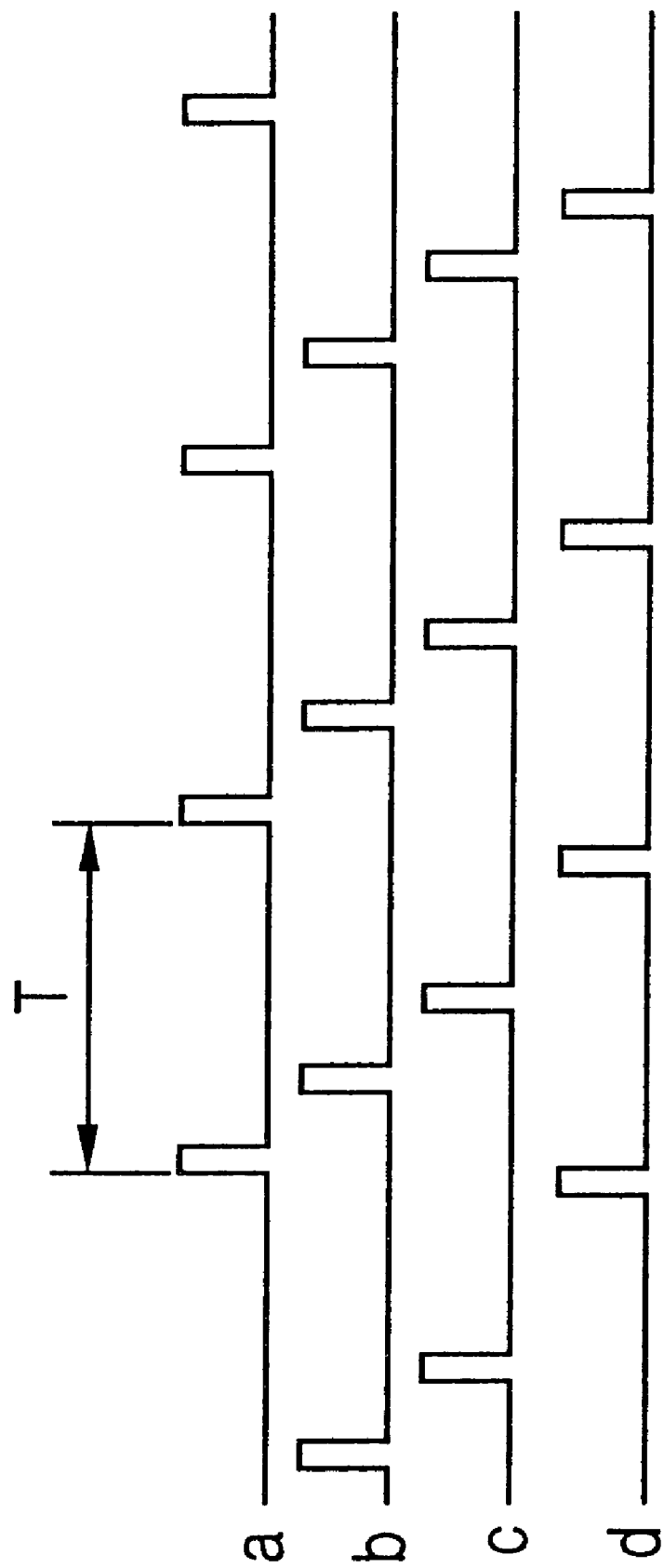
FIG. 5 illustrates ID codes transmitted by the non-detection side vehicles A, B. C, and D in FIG. 4.

In the above, communication control is carried out at a detection side moving body and a non-detection side moving body, but the actual control procedure is described in accordance with a specific example shown in FIG. 4 and FIG. 5.

FIG. 4 shows a simplified plan view of the progress of a plurality of vehicles. A detection side vehicle Z proceeds from the left side towards a crossroads and is intending to turn right at the crossroads. In the opposite lane, five vehicles A, B. C, D and E, constituting non-detection side vehicles are proceeding towards the crossroads.

Each of the vehicles A, B. C and D transmits its own ID code signal, with ID code signals a, b, c and d for the non-detection side vehicles A, B. C and D being shown in FIG. 5. Each of the ID code signals a, b, c and d are output within the same period T but are not in synchronism with each other.

Figure 6:
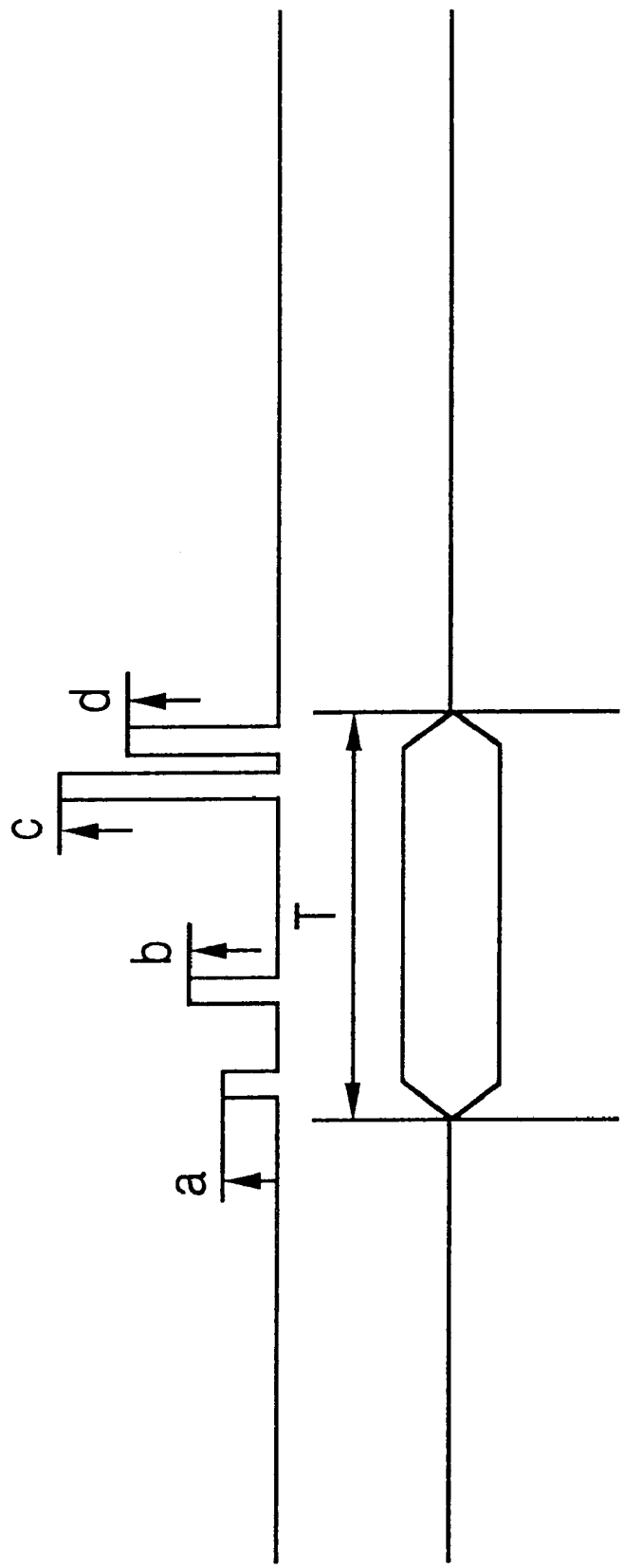
FIG. 6 illustrates the ID codes received by the detection side vehicle Z in FIG. 4.

When the right indicator switch is operated in order for the detection side vehicle Z to turn right, the receiving circuit 3 of the detection side vehicle Z adopts a receive state only for the same period of time T as the period T of the ID code signal. As shown in FIG. 6, ID code signals a, b, c and d for the non-detection side vehicles A, B. C and D are received.

In this example the receipt number N is 4; however, since each code signal is for the same period T, the ID code signals that can be received are for all signals within the time T.

The signal receiving power for each of the ID code signals a, b, c and d becomes more attenuated as the place of transmission becomes further away. Therefore, the signal receiving power is highest for the ID code signal c from the vehicle C, which is the closest to the vehicle Z. The ID code signals d, b and a then follow in that order.

The signal receiving power discrimination circuit 5 for the detection side vehicle Z then compares the signal receiving power values for the ID code signals a, b, c and d and arranges the ID codes in order of priority from the largest signal receiving power value.

The order is therefore determined from the closeness to the detection side vehicle Z, with the ID code of the ID code signal c being first, the ID code of the ID code signal d being second, the ID code of the ID code signal b being third, and the ID code of the ID code signal a being fourth.

The detection side vehicle Z first transmits a detection signal with the first ID code and the ID code of the detection side vehicle itself attached. Since this detection signal coincides with the ID code of the non-detection side vehicle C, the non-detection side vehicle C transmits a response signal with its own ID code and the detection side ID code added thereto. This response signal is then received by the detection side vehicle Z, and the distance to the non-detection side vehicle C is measured.

The detection side vehicle Z then measures the distance to the non-detection side vehicle D by transmitting signals to and receiving signals from the non-detection side vehicle D for the second ID code. Sequential exchange of signals with the non-detection side vehicles B and A for the third and fourth ID codes is then carried out and the respective distances are measured.

The detection side vehicle Z intending to turn right measures the distances to the four non-detection side vehicles A, B. C and D travelling in the opposite lane for which ID code signals have been received. The driver of the detection side vehicle Z can therefore recognize the arrangement of the four vehicles A, B. C and D.

If the measurements are displayed soon after being measured, the measurements are displayed in order of the nearest vehicle. The distance to the nearest opposing vehicle C can therefore be quickly determined.

In this embodiment, when the detection side vehicle operator operates the right indicator switch in order to make a right turn, the ID code is received and a detection signal is transmitted. However, an ID code signal can also be received and a detection signal transmitted using changes in other driving conditions or driver switch operations, etc.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

We claim:

1. A moving body detection system for detecting moving bodies by transmitting and receiving signals between the moving bodies, comprising:

means mountable to each of the moving bodies for transmitting an ID code capable of identifying a respective moving body;

means mountable to a detection side moving body for receiving ID code signals from non-detection side moving bodies according to changes in driving conditions, for discriminating the received ID codes and arranging an order of priority for each of the ID codes based on the discrimination results, and for transmitting a detection signal with the ID code and an ID code for the detection side moving body added thereto at prescribed time intervals in ID code order;

means mountable to the non-detection side moving bodies for receiving the detection signal, and for transmitting a response signal having an ID code of a respective non-detection side moving body and the ID code of the detection side moving body added thereto if the ID code added to the detection signal is the same as the ID code of the respective non-detection side moving body; and means mountable to the detection side moving body for receiving the response signal and measuring a distance to the respective non-detection side moving body having the same ID code as the response signal.

2. The moving body detection system according to claim 1, wherein the means mountable to each of the moving bodies for transmitting the ID code is a fixed output ID code signal transmitted for a fixed period, and the means mountable to the detection side moving body for receiving ID code signals from non-detection side moving bodies receives ID code signals having the same transmission period as the ID code signal.

3. The moving body detection system according to claim 1, wherein the means mountable to the detection side moving body for receiving the ID code signals determines the signal receiving power of each of the ID code signals and decides an order for the ID codes with the largest signal receiving power being first.

4. The moving body detection system according to claim 2, wherein the means mountable to the detection side moving body for receiving the ID code signals determines the signal receiving power of each of the ID code signals and decides an order for the ID codes with the largest signal receiving power being first.

5. The moving body detection system according to claim 1, wherein the means mountable to the detection side moving body for receiving the ID code signals according to changes in driving conditions receives the ID code signals in response to a turn indicator switch being operated.

6. The moving body detection system according to claim 2, wherein the means mountable to the detection side moving body for receiving the ID code signals according to changes in driving conditions receives the ID code signals in response to a turn indicator switch being operated.

7. The moving body detection system according to claim 3, wherein the means mountable to the detection side moving body for receiving the ID code signals according to changes in driving conditions receives the ID code signals in response to a turn indicator switch being operated.

8. The moving body detection system according to claim 4, wherein the means mountable to the detection side moving body for receiving the ID code signals according to changes in driving conditions receives the ID code signals in response to a turn indicator switch being operated.

9. A moving body detection system for detecting moving bodies by transmitting and receiving signals between the moving bodies, comprising:

a plurality of moving bodies has means mounted thereto for transmitting an ID code capable of identifying a respective of the plurality of moving bodies;

a detection side moving body of the plurality of moving bodies has means mounted thereto for receiving ID code signals from non-detection side moving bodies of the plurality of moving bodies according to changes in driving conditions, for discriminating the received ID codes and arranging an order of priority for each of the ID codes based on the discrimination results, and for transmitting a detection signal with the ID code and an ID code for the detection side moving body added thereto at prescribed time intervals in ID code order;

the non-detection side moving bodies have means mounted thereto for receiving the detection signal, and for transmitting a response signal having an ID code of a respective non-detection side moving body and the ID code of the detection side moving body added thereto if the ID code added to the detection signal is the same as the ID code of the respective non-detection side moving body; and the detection side moving body has means mounted thereto for receiving the response signal and measuring a distance to the respective non-detection side moving body having the same ID code as the response signal.

10. The moving body detection system according to claim 9, wherein the means mounted to the plurality of moving bodies for transmitting the ID code is a fixed output ID code signal transmitted for a fixed period, and the means mounted to the detection side moving body for receiving ID code signals from non-detection side moving bodies receives ID code signals having the same transmission period as the ID code signal.

11. The moving body detection system according to claim 9, wherein the means mounted to the detection side moving body for receiving the ID code signals determines the signal receiving power of each of the ID code signals and decides an order for the ID codes with the largest signal receiving power being first.

12. The moving body detection system according to claim 10, wherein the means mounted to the detection side moving body for receiving the ID code signals determines the signal receiving power of each of the ID code signals and decides an order for the ID codes with the largest signal receiving power being first.

13. The moving body detection system according to claim 9, wherein the means mounted to the detection side moving body for receiving the ID code signals according to changes in driving conditions receives the ID code signals in response to a turn indicator switch being operated.

14. The moving body detection system according to claim 10, wherein the means mounted to the detection side moving body for receiving the ID code signals according to changes in driving conditions receives the ID code signals in response to a turn indicator switch being operated.

15. The moving body detection system according to claim 11, wherein the means mounted to the detection side moving body for receiving the ID code signals according to changes in driving conditions receives the ID code signals in response to a turn indicator switch being operated.

16. The moving body detection system according to claim 12, wherein the means mounted to the detection side moving body for receiving the ID code signals according to changes in driving conditions receives the ID code signals in response to a turn indicator switch being operated.

* * * * *